US005582847A

United States Patent [19]

Peterson et al.

[11] Patent Number: 5,582,847

[45] Date of Patent: Dec. 10, 1996

[54] OPTIMIZING PELLET MILL CONTROLLER

[75] Inventors: Norman R. Peterson, Pewaukee; Richard A. Jorgensen, Colgate; Mark E. Ossanna, Slinger; Jeffrey J. Otten, Brookfield, all of Wis.

[73] Assignee: Repete Corporation, Sussex, Wis.

[21] Appl. No.: 425,126

[22] Filed: Apr. 19, 1995

Related U.S. Application Data

[62] Division of Ser. No. 68,885, May 28, 1993, Pat. No. 5,472, 651.

[51] Int. Cl.[6] .............................. B29C 67/00; G06F 19/00

[52] U.S. Cl. .................... 425/144; 364/152; 364/468.24; 425/145

[58] Field of Search .................................... 364/148, 152, 364/153, 184, 185, 468; 425/136, 144, 145

[56] References Cited

U.S. PATENT DOCUMENTS

| | | | |
|---|---|---|---|
| 3,707,978 | 1/1973 | Volk, Jr. | 137/2 |
| 3,932,736 | 1/1976 | Zarow et al. | 425/DIG. 23 |
| 4,327,871 | 5/1982 | Larsen | 241/18 |
| 4,463,430 | 7/1984 | Volk, Jr. et al. | 364/468 |
| 4,742,463 | 5/1988 | Volk, Jr. | 364/468 |
| 4,751,030 | 6/1988 | Volk, Jr. | 264/40.6 |
| 4,764,874 | 8/1988 | Volk, Jr. | 364/468 |
| 5,021,940 | 6/1991 | Cox et al. | 364/148 |
| 5,402,352 | 3/1995 | Kniepmann et al. | 364/468 |

*Primary Examiner*—Robert Davis
*Attorney, Agent, or Firm*—Quarles & Brady

[57] ABSTRACT

A controller for controlling a pellet mill, used to extrude milled ingredients through a die into more manageable and economical pellets, keys particular control parameters to a library of pellet types and then adjusts the control parameters to optimize throughput within the limits imposed by potential plugging of the die. If a potential plugging is detected, the controller responds in two stages, intended to reduce the restart time for pluggings of less severity, and thus to allow more aggressive operation. Pellet fines are recycled and liquid ingredients compensated to provide improved efficiency.

6 Claims, 9 Drawing Sheets

OPTIMIZING PELLET MILL CONTROLLER

This is a division of application Ser. No. 08/068,885 filed May 28, 1993 now issued as U.S. Pat. No. 5,472,651 issued Dec. 5, 1995.

BACKGROUND OF THE INVENTION

1. Field of the Invention

The present invention relates to a method and apparatus for controlling the operation of a pellet mill which is used to compress raw ingredients into extended pellets livestock feed and the like. More specifically, the present invention relates to a controller for optimizing the operation of a pellet mill for a variety of ingredients and pellet sizes.

2. Background Art

The forming of dry, finely milled materials (typically referred to as "mash") into larger pellets permits the materials to be more efficiently handled, minimizing dust and loss. When there are multiple ingredients, pelletizing insures the ingredients are delivered in a consistent ratio without separation or settling. In the livestock industry, where pellets are formed of ground feed materials, pelletizing can reduce the waste of costly additives such as vitamins, hormones and antibiotics and prevent selective feeding by the livestock guaranteeing that they receive the intended formulation.

The forming or "pelleting" of dry ingredients into pellets is accomplished by a pellet mill. Typically, a pellet mill consists of a die in the form of a large hollow cylinder having a number of radially extending holes through which pellets may be extruded. The inner surface of the cylinder contacts the rolling faces of a plurality of rollers which squeeze the ingredients to be pelletized through the die when the die is rotated about the rollers. The extruded pellets, initially long, solid cylinders, are broken across their length into smaller pieces.

In order to improve the cohesion of the dry ingredients and to improve their nutritional quality, the ingredients are processed, prior to introduction to the pellet mill die, in a conditioner which mixes the ingredients together, introduces liquids and heats the ingredients to a desired temperature.

As with most industrial equipment, it is desirable that the pellet mill be operated at high efficiency. This requires that the down time of the pellet mill be minimized, and that the throughput of the pellet mill, while running, be maximized. One cause of down time is the plugging of the die by the ingredients. Such plugging may require that the pellet mill be stopped and the dies removed so that the plugged orifices may be opened. Once this is accomplished, further time may be wasted restarting the mill as the conditioner is refilled and the new ingredients heated and moistened. Because the mechanisms of plugging are not well understood and may differ for different ingredients, it is typical that the pellet mill is operated at a conservative rate significantly below its potential throughput.

SUMMARY OF THE INVENTION

The present invention provides a means of increasing the operating efficiency of a pellet mill by providing for real-time adjustment of the control parameters of the pellet mill as moderated by a determination of the likelihood of a plug forming. The initial control parameters are linked to the state of the pellet mill (warm or cold) and the type of pellets being produced (size and ingredients) to approximate the optimum running conditions via a library of pellet types and a monitoring of past mill usage. During operation, the mill is "challenged" by adjusting these initial control parameters to increase the throughput while monitoring the potential for plugging. If a plug condition is anticipated, the control system provides a two-stage response intended to tailor the response to the severity of the potential plugging and hence to minimize the disruption in the pelletizing process in clearing the plugging. Finally, the invention provides a way to efficiently recycle pellet fragments without wasting valuable additives and to accurately monitor the actual pellet production, a key step in improving the through-put.

Specifically, the controller includes a memory for storing a library of different control parameters for controlling the operation of the pellet mill. Each control parameter is associated with one of a number of pellet types having different physical characteristics. The controller has an input device for receiving an input indicating the physical characteristics of the pellet to be produced by the pellet mill. An operator then selects a current control parameter from the library based on the input physical characteristics. Importantly, the control parameter may provide inputs to a plug detector that monitors the power employed by the mill to produce a plug anticipation signal. Thus, the plug detection may be tailored to the pellet type.

Also, the controller may include a state indicator providing a state signal indicating whether the pellet mill is warm or cold. A memory, receiving the state signal, in turn provides at least one either warm or cold stored control parameter corresponding to the state signal. A timer responsive to the operation of the pellet mill changes the state of the state indicator from warm to cold when the pellet mill has not operated for a first predetermined period of time and from cold to warm when the pellet mill has operated for a second predetermined period of time. The stored warm and cold parameters may control the rate with which the pellet mill reaches a set operating point.

It is one object of the invention to match the control parameters to the type of ingredients and the state of the mill and thus to allow the pellet mill to more rapidly and closely approach its optimum operating conditions without plugging. The inventors have determined that when the pellet mill is in the warm condition, it is less susceptible to plugging and thus may be more rapidly brought to peak operating conditions. Further, it has been determined that the type of pellet being produced significantly affects the propensity of the mill to plug. Both factors are taken into account allowing the pellet mill to run at its optimum efficiency regardless of pellet type and to achieve that operating efficiency most quickly.

During operation, the controller brings the temperature of the ingredients in the conditioner to an initial temperature while monitoring the power consumed by the mill. This temperature is repeatedly increased by a predetermined amount and its effect on mechanical load isolated. An additional increase in temperature is made so long as the temperature increase's effect on mill power is to decrease mill power by a predetermined amount.

The isolated effect of temperature on mill power may be determined by monitoring the feed rate of ingredients when the feed rate is controlled to be a function of the deviation of the mill power from a mill power set point. Increasing the temperature of the ingredients when the mill is running at a suboptimal level, decreases the load on the mill, which in turn increases the feed rate of the ingredients restoring the mill power to a point near its set point. So long as a predetermined increase in the feed rate of ingredients is seen, it is assumed that the increase in temperature would cause a reduction in mill power if isolated.

Failure to note a decrease in isolated mill power is indicative of potential plug conditions and thus signals the controller to stop the temperature increase.

It is thus another object of the present invention to provide a systematic and automatic technique for increasing the pellet throughput of a pellet mill, for a wide variety of different ingredients and operating conditions, without causing costly plug conditions and thus decreasing the overall operating efficiency of the pellet mill.

The pellet mill may employ a two-stage response to an anticipated plugging. First, a dump chute positioned before the die of the pellet mill may be opened to divert the ingredients to the diversion area and reducing the feed rate if the imminent plugging is first detected within a predetermined time period. Second, the feed rate is stopped if more than one imminent plugging is detected within a predetermined time period.

Thus, it is another object of the invention to provide a graduated response to an anticipated plug which, at a first level, does not stop the flow of material and thus permits rapid restart once a plug condition has passed but which, at a second level, provides a more positive response to the plugging. A flexible approach to plug anticipation allows a plug condition to be more nearly approached thus also improving the overall efficiency of the equipment.

An unavoidable part of the production of pellets is the production of fines, the latter being unpelletized ingredients. The pellet mill may include a pellet separator for separating the fines from the pellets and returning the fines to the conditioner after a transit time. Correspondingly, the controller controls the liquid flow rate as a predetermined proportion of the feed rate and develops a fine rate signal proportional to the mass of fines returning to the conditioner. A start time is identified at which the heated ingredients are first introduced to the die and roller assembly for extrusion, and the controller, after delaying for the transit time after the start time, decreases the liquid flow rate in proportion to the fine rate. The fine rate signal may be determined by taking a predetermined fraction of the feed rate. The fine rate and feed rate may be integrated over time and subtracted to produce a signal indicating the total quantity of pellets produced.

Thus, it is another object of the invention to efficiently use the liquid materials added to the pellets and to accurately measure the pellet output. Although the ingredients of the pellets are generally relatively inexpensive, certain additives such as antibiotics, vitamins, hormones and tranquilizers, which may be added to the pellets, significantly affect the cost of manufacture. By recycling the fines through the pellet mill again, but decreasing the addition of these ingredients, total cost to produce the pellets may be reduced. Correcting the output measurement by the amount of fines recycled allows accurate throughput monitoring, essential for improving throughput.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

A. Pellet Mill Hardware

Figure 1:
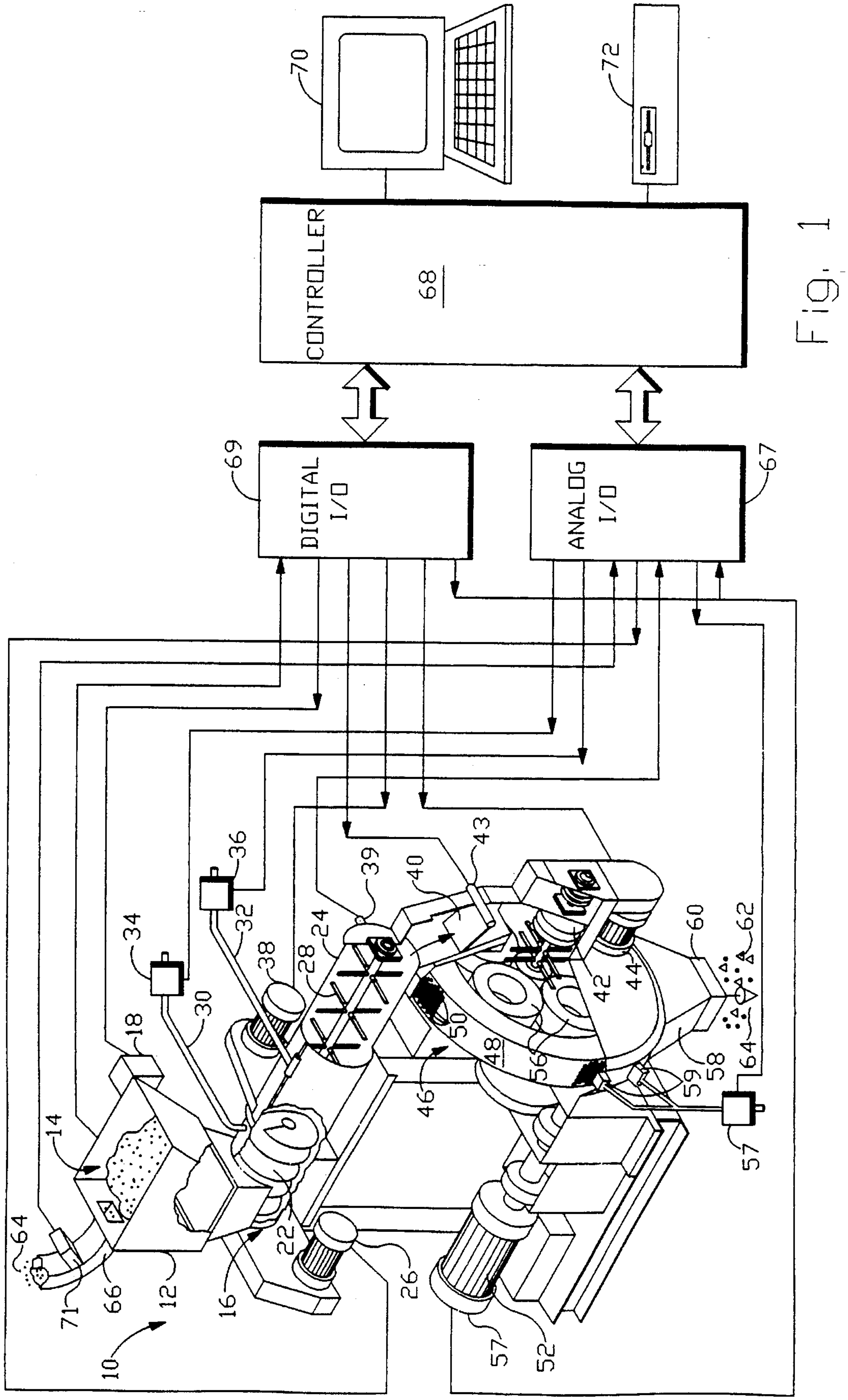
FIG. 1 is a perspective view in cut-away of a pellet mill as connected to a controller shown in schematic block diagram as may be used in the present invention.

Referring to FIG. 1, a pellet mill 10 has a surge hopper 12 holding a supply of dry ingredients 14 from which pellets may be made. The surge hopper 12 communicates with a feeder 16 so that dry ingredients 14 may fall into the feeder 16, as urged by vibrator 18, to be transported by auger 22 to conditioner 24. The feed rate of the feeder 16 is controlled by a variable speed feeder motor 26, turning auger 22, that provides a tachometer output that may be used to determine a feed rate for the entire pellet mill as will be described.

The conditioner 24 receives the dry ingredients 14 and stirs them via paddles 28, turned by conditioner motor 38, while heating the ingredients with steam from steam inlet 30 and introducing other liquid ingredients through liquid inlet 32. Only one liquid inlet is shown. However, a pellet mill 10 may have multiple such inlets for introducing multiple liquid ingredients. The amount of steam introduced through steam inlet 30 is controlled by steam modulating valve 34 and the amount of liquid ingredients is controlled by liquid modulating valve 36. A temperature sensor 39 provides a reading of the temperature of the ingredients 14 as they leave the conditioner 24.

When the ingredients 14 have reached the proper temperature and consistency in the conditioner 24, as controlled by the amount of steam allotted by steam modulating valve 34 and the length of time during which the ingredients 14 are within the conditioner 24 as determined by the pitch of the paddles 28, which are mechanically adjusted, the ingredients 14 pass from the conditioner 24, past a dump chute 40, to a Centrifeeder auger 42.

The dump chute 40, as controlled by actuator 43, allows the unobstructed passage of heated ingredients 14 from the conditioner 24 to the Centrifeeder auger 42 when the dump chute 40 is in the closed condition. However, when the dump chute 40 is in a open position, the dump chute 40 diverts the heated ingredients 14 to a diversion area outside the pellet mill 10. This diversion may be done when a plugging of the pellet mill die is anticipated as will be described below.

The Centrifeeder auger 42 is turned by auger motor 44 and controls the feeding of the heated ingredients 14 into the center of a die and roller assembly 46. Specifically, the ingredients 14 are introduced into the center of a hollow, cylindrical die 48 which turns about a horizontal axis and which has radially extending die holes 50. The die 48 is turned about the axis by die motor 52 which includes horsepower gauge 54 which provide a reading of the total power consumed by the motor 52 and hence by the die and roller assembly 46 in extruding pellets.

A set of rollers 56 roll about the inner circumference of the die 48, around axes parallel to that of die 48, to press the ingredients 14 through the die holes 50 extruding the ingredients into pellets 62. Additional liquid is sprayed outside the rotating die 48 via nozzles 59 under the control of die liquid modulating valve 57.

The pellets 62, once extruded through the holes 50, are caught by shroud 58 surrounding the die and roller assembly 46. Typically, but not shown in FIG. 1 for clarity, the pellets 62 are transported to a cooler for cooling and then to a crumbler for breaking them into smaller lengths, and finally to a screen which separates the pellets 62 from fines 64, the latter which consist of fragments of pellets 62 and ingredients 14 that otherwise remained unpelletized.

The fines 64 are returned, via a conveyer to chute 66 and thence to the feeder 16 to be recycled through the pellet mill 10. The chute 66 may include an impact scale 71 providing a reading of the mass rate of return of fines to the feeder 16.

A controller 68 coordinates the operation of the various components of the pellet mill 10. The feeder motor 26 accepts an RPM command from analog I/O circuitry 67 of controller 68 and provides a tachometer signal back to digital I/O circuitry 69 of the controller 68 to provide the controller 68 with a measure of the rate of movement of ingredients 14 through the pellet mill 10. Likewise, the load of the die motor 52 is controlled and monitored by the controller 68, the load signal being provided by horsepower gauge 54 as previously described. Centrifeeder auger motor 44 and conditioner motor 38 are single speed motors which also may be controlled by the digital I/O circuitry 69 of the controller 68, and likewise actuator 43 for the dump chute 40 opens and closes under control of digital I/O circuitry 69.

Modulating valves 34 and 36 may be controlled by the analog I/O circuitry 67 of the controller 68 to change the conditioning temperature and amount of liquid ingredients added to the dry ingredients 14 as will be described below. In this regard, the analog I/O circuitry also receives the input of temperature sensor 39 which indicates the temperature of the ingredients leaving the conditioner 24.

The controller 68 is of conventional microprocessor architecture and includes a processing unit and associated random access memory (not shown). Also connected to the controller 68 is a console 70 being typically a CRT screen and keyboard. A mass storage device 72, such as a floppy disk drive, is provided for off-line storage of system parameters as will be described and for the receipt of a control program.

B. Controller Software Overview

Figure 2:
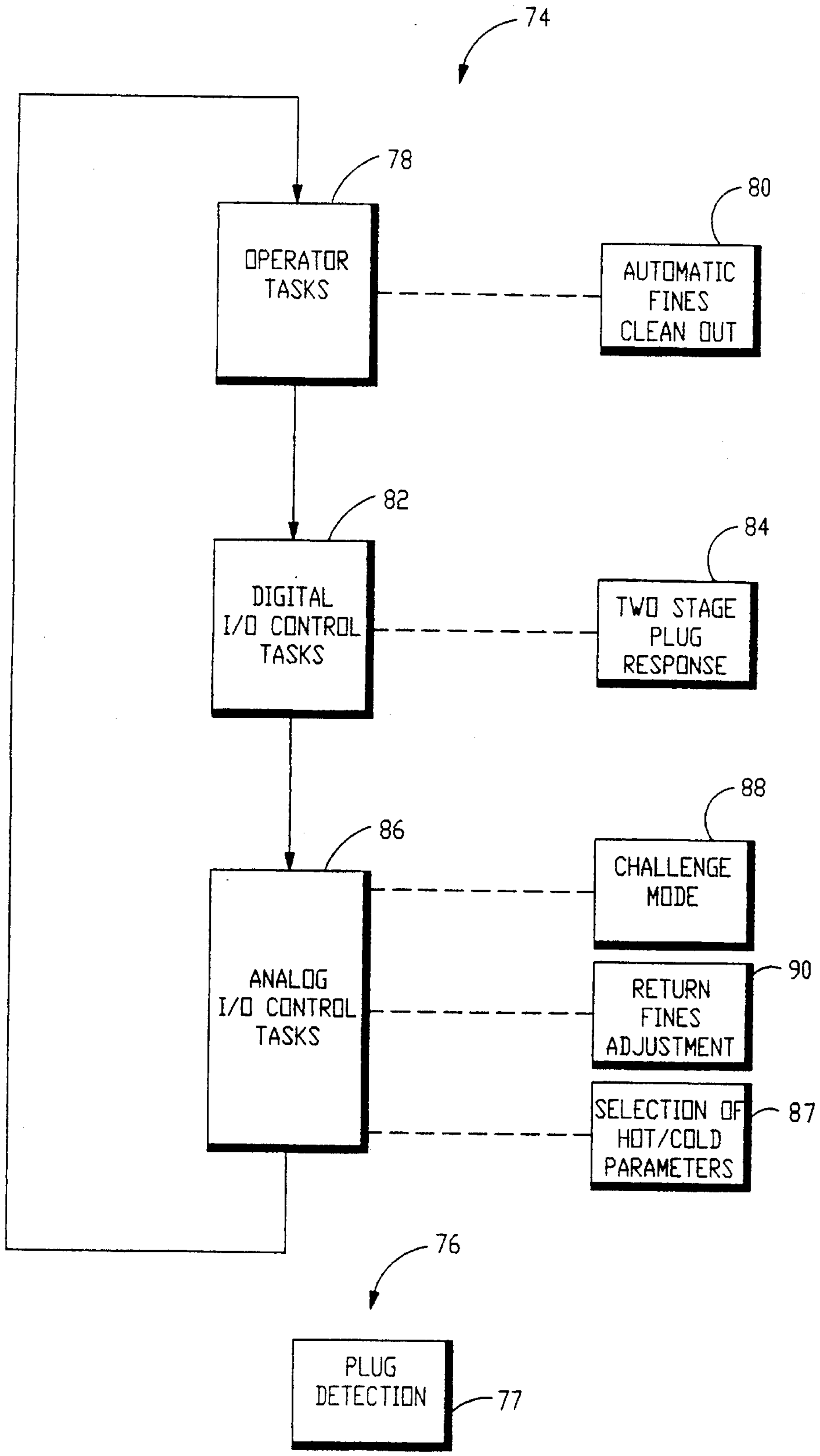
FIG. 2 is a master flow chart showing the principal portions of the program running on the controller of FIG. 1.

Referring now to FIG. 2, the controller 68 operates under the control of a stored program having a near real-time portion 74 which operates in a continuous loop and an interrupt driven portion 76 which "interrupts" the near real-time portion 74 periodically as dictated by a hardware clock. The interrupt portion 76 provides a code where precise execution on a periodic basis is necessary. The near real-time portion 74 provides control over the pellet mill in aspects where such precision is not required or where sufficient time exists to interrogating a system clock.

The near real-time portion 74 principally includes three functional blocks 78–86. The first block of operator tasks 78 concerns generally receiving commands from the operator via console 70, as has been previously described, and allowing the input of various user controllable parameters, by the operator, as will be discussed further below. The operator tasks 78 also include running certain executable commands such as that to initiate the pelleting, or for the automatic fine clean-out indicated by process block 80 and as will be described in detail below.

During the real-time portion of the program 74, the operator task block 78 is repeatedly executed to see if there are any inputs from the operator or outputs required to the console 70 indicating the status of the control process. Once these inputs have been received, and if appropriate, processed, and any outputs provided, the program 74 proceeds to process block 82 in which the digital I/O control tasks are undertaken.

The digital I/O block 82 generally includes control of parts of the pellet mill 10 in communication with the digital I/O circuit 69—which are typically not under feedback loop control. In particular, the digital I/O control block 82 opens and closes the dump chute 40, turns on and off vibrator 18, and stops and starts the Centrifeeder auger 42 and the paddle 28 and the rotation of the die 48 by control of motors 44, 38, and 52, respectively. The digital I/O control block 82 also directs a two-stage plugging response 84, as will be described further below, which controls the action of the pellet mill 10 in anticipation of a plug condition.

Once the digital I/O control tasks 82 are complete, the program loops to analog I/O control tasks 86 which generally control those elements of the pellet mill 10 operating under a feedback control loop. In particular, this portion of the program adjusts the feed rate of ingredients 14 through the feeder 16, to control the horsepower consumption of the die and roller assembly 46 to equal a predetermined horsepower setpoint, and adjusts the opening of the steam modulating valve 34, in response to the temperature received on the temperature sensor 39, to ensure ingredients exiting the conditioner 24 are heated to a predetermined temperature setpoint. The predetermined temperature setpoint may be modified by a challenge mill routine 88 which adjusts the temperature setpoint of the conditioner 24 to improve the operating efficiency of the pellet mill 10, as will be described below. The analog I/O control block 86 also controls the feeding of liquid ingredients via valve 36 in response to the speed of the feeder 16 so as to mix a predetermined proportion of dry and wet ingredients together in the conditioner 24. A return fines adjustment routine 90 adjusts this predetermined proportion in response to a proportion of fines returning to the feeder 16, as will also be described below. At the conclusion of the analog I/O tasks block 86, the near real-time program 74 loops back to the operator tasks block 78 to begin the cycle again.

The interrupt program 76 operates independently of the program 74, interrupting the program 74 to direct the controller to the interrupt program on a periodic basis (every 0.1 sec) as controlled by a hardware clock (not shown). The interrupt program 76 primarily includes a plug detection routine 77 which is interrupt driven because it requires accurate assessment of trends in horsepower on a regular basis. This plug detection routine 77 will be described below.

C. Operation of the Pellet Mill

1. Initial Operating Parameters

Prior to operation of the pellet mill 10, an operator at console 70 will enter parameters for controlling the pellet mill 10 through, the console 70. The near real-time program 74 receives and responds to these keyboard commands at the operator tasks block 78, as generally described. During the inputting of control parameters, the user is presented with a series of menus through which the desired parameters may be selected. During the entering of data or commands, the program is continuing to loop through process block 82, the digital I/O control tasks and process block 86 and the analog I/O control tasks. This permits data entry by the operator to be accomplished even during control of the pellet mill while the pellet mill is running.

The user may enter or change default values of a variety of parameters used to control the pellet mill 10. These parameters include assignment of the I/O addresses of the controller 68 to particular elements of the pellet mill 10, the establishing of setpoints and other control factors, and the definition of certain criteria for monitoring such as those used to anticipate a plug.

Generally, the entered parameters may be grouped according to those which are independent of the pellet type being produced ("global") and those which change depending on the pellet type being produced ("local"). Table I lists selected parameters in the former category which are independent of the pellet types and will be referred to below.

TABLE I

Global Parameters

| number | meaning | units |
|---|---|---|
| 1. | Die cold after this time period | (HR:MIN) |
| 2. | Die warm after this time period | (HR:MIN) |
| 3. | Fines recycle time | (MIN:SEC) |
| 4. | Fines clean-out delay | (MIN:SEC) |
| 5. | Minimum fines clean-out time | (MIN:SEC) |
| 6. | Maximum horsepower | (HP) |
| 7. | Horsepower average deviation | (HP) |
| 8. | Horsepower average | (HP) |
| 9. | Horsepower deviation | (HP) |
| 10. | Percent drop in feeder speed when dump chute open | (%) |
| 11. | Percent drop in steam modulating valve when dump chute open | (%) |
| 12. | Close dump chute below this horsepower | (HP) |
| 13. | Delay after dump chute closed | (MIN:SEC) |
| 14. | Horsepower not low time-out | (MIN:SEC) |
| 15. | Multiple plug time-out | (MIN:SEC) |

These parameters will be discussed in more detail below but are summarized as follows: Parameters 1 and 2 define times during which the pellet mill must be "off" or "on" for the pellet mill to be considered cold or warm respectively.

Parameters 3 and 4 and 5 generally reflect the transport time of the fines between the die 48 and the feeder 16 and the amount of time required for the feeder and conditioner to be cleared of all materials except for fines. The "minimum fines clean-out time" (5) defines how long the clean-out process will continue regardless of the actual load on the mill.

Parameters 6, 7, 8 and 9 are thresholds used to anticipate a plug condition and reflect changes in the horsepower of motor 52. Parameter 6 is a maximum instantaneous horsepower. Parameter 7 is an average over one second of the differences between horsepower readings taken every 10th of a second. Parameter 8 is an average over ½ second of horsepower readings taken every 10th of a second and parameter 9 is a difference between horsepower readings taken one second apart.

Parameters 10 and 11 are idle speeds for the feed and the steam modulating valve when the first stage of the two-stage plug response 84 is activated and the dump chute 40 is open. These reduced operating values allow continuous processing of the material by the feeder 16 and conditioner 24 and thus improve the start-up after any plugging has cleared but reduce the total throughput to avoid "shocking" the pellet mill with a high feed rate when the dump chute 40 is closed again.

Parameters 12 through 15 are various adjustable delay periods and a horsepower threshold for motor 52 used in the response to a potential plug as will be described in more detail below.

Local parameters are keyed to the particular pellet type being produced. A library of pellet types is stored in the memory of the controller 68 as may be defined by the operator through console 70. Each pellet type is linked to a particular formula for the pellet ingredients including dry and liquid ingredients and to a pellet die 48, the dies 48 differing primarily by the size of their extrusion holes 50. Table II lists a set of parameters that are entered and are specific to a particular pellet type.

TABLE II

Local Parameters

| number | meaning | units |
|---|---|---|
| 1. | Pellet mill horsepower setpoint | (HP) |
| 2. | Initial Conditioner temperature setpoint | (°F.) |
| 3. | Density | (LBS./CU.FT) |
| 4. | Conditioner liquid setpoint | (%) |
| 5. | Cold ramp adjustment rate | (%) |
| 6. | Initial feeder speed setting | (%) |
| 7. | Initial steam modulating valve setting | (%) |
| 8. | Feeder speed at fines clean-out | (%) |
| 9. | Steam modulating valve at fines clean-out | (%) |
| 10. | Plug anticipation sensitivity | (%) |
| 11. | PDI factor | (%) |
| 12. | Challenge pellet mill? | (Y/N) |
| 13. | Temperature increment | (°F.) |
| 14. | Feeder speed increment | (%) |
| 15. | No-load horsepower | (HP) |
| 16. | Maximum challenge temperature increase | (°F.) |
| 17. | Steam on above horsepower | (HP) |
| 18. | Horsepower gain factor | (%) |
| 19. | Temperature gain factor | (%) |

Again, these parameters will be discussed in more detail below but are summarized as follows: Parameters 1 and 2 are the initial setpoints for the desired mill horsepower and the conditioner temperature. As will be described further below, the temperature setpoint may be modified by a learning process as the mill runs.

Parameter 3 is a density figure for the dry ingredients used to calculate the total mass flow of ingredients for use in proportioning the liquid ingredients and for computing the total mass of pellets ultimately produced. Parameter 4 is the ratio of liquid ingredients to dry ingredients.

Parameter 5 modifies parameters 6, 7, 18 and 19 depending on whether the pellet mill 10 is cold or warm. When the pellet mill is cold the parameters 6, 7, 18 and 19 are reduced by this percentage reflecting the recognition that the pellet mill runs harder when it is cold. Parameters 18 and 19 control how fast the pellet mill 10 "ramps" to the setpoints of local parameters 1 and 2 from the values of local parameters 6 and 7.

Parameters 8 and 9 concern the open loop operation of the pellet mill during fines clean-out and parameter 10 describes an adjustment factor applied to the plug anticipation parameters (global parameters), the adjustment factor being related to the particular pellet type.

Parameter 11 is a pellet durability factor (PDI) which allows estimation of the weight of fines produced as a percentage of weight of ingredients produced.

Parameter 12 is a flag telling the program 74 whether to "challenge" the pellet mill to further optimize its operation and parameters 13 and 14 control the rate of the challenging.

The plug anticipation sensitivity parameter takes a percentage of the global variables previously described with respect to plug anticipation allowing tailoring of this detection process to the particular pellet type. The percentage may be greater than or less than 100%.

Once each of these global and local parameters is entered, the value is stored in the memory of the controller 68 for use during the digital I/O control tasks 82, the analog I/O control tasks 86 and the plug detection 77.

2. Selection of warm or cold parameters

After the necessary parameters and adjustment in parameters have been entered at the operator task block 78, the operator may initiate a pelleting run from the console 70 and the various aspects of the pellet mill 10 will be controlled by the system controller in the digital I/O control tasks block 82 and the analog I/O control tasks block 86. Depending on the recent history of the operation of the pellet mill 10, the state of the pellet mill 10 will be either "warm" or "cold" as is continuously determined in process block 86. The identification of this state is employed in the selection of control parameters of the pellet mill 10.

Figure 3:
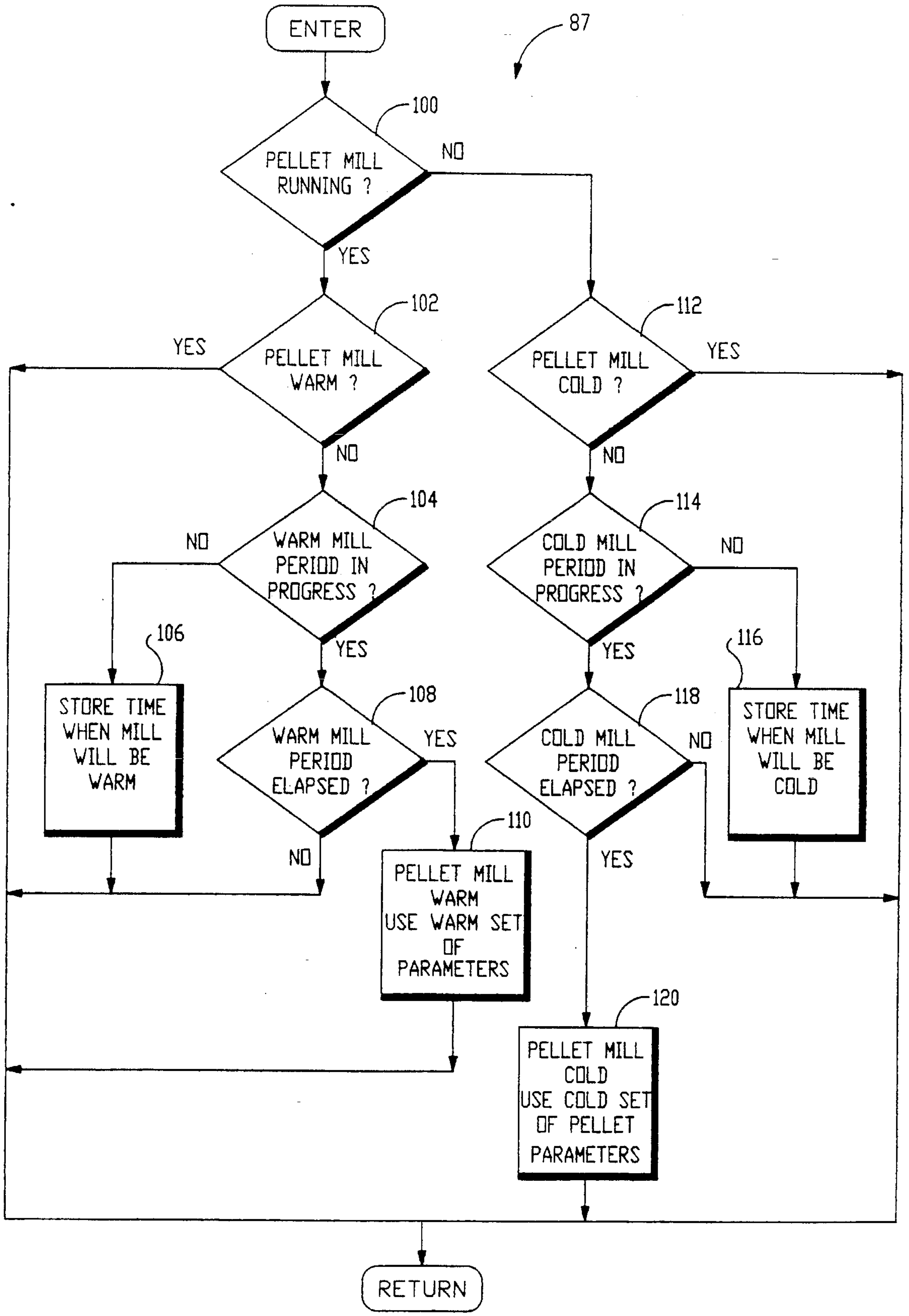
FIG. 3 is a flow chart of a portion of the program of FIG. 2 showing the selecting of the control parameters for operating the pellet mill according to the recent history of the pellet mill's operation.

Referring now to FIGS. 2 and 3, in routine 87, if the pellet mill 10 is currently running (as is determined at decision block 100 from a flag stored in the processor's memory and set by an operator command to start a pelleting run) the program 74 proceeds to decision block 102 where the state of the pellet mill is checked to see if the pellet mill is "warm" or "cold". Assuming that the pellet mill is cold, as will typically be true at the start of pelleting operations for a given day, the routine proceeds to decision block 104 to check if a warm period countdown, via an internal timer, is underway. The length of this countdown period is given by parameter 2 of Table I.

It is assumed that the countdown is underway if a nonzero value is in the timer and the mill is not in the warm state. If no countdown is occurring, then at decision block 104 the routine proceeds to process block 106 and the proper warm countdown period is loaded into the timer and the timer begins the countdown process. After the countdown period is loaded, the routine 87 is returned to be re-entered on the next loop of the near real-time program 74 through analog I/O tasks 78.

If at decision block 104, the warm period countdown is in progress, then at decision block 108, the timer is interrogated to see if the warm mill time has just expired. If not, the routine 87 is returned from, but if so, at process block 110, a flag is set indicating that the mill is warm and that a warm set of parameters should be employed. Specifically, the warm parameters 6, 7, 18 and 19 of Table II are used.

If at decision block 100, the pellet mill is not running, the routine 87 passes to decision block 112 to see if the flag described with respect to process 110 indicates that the state of the pellet mill 10 is cold. If it is, the routine 87 returns, but if not, the routine 87 branches to decision block 114, which is analogous to decision block 104, but which investigates whether a cold period countdown is in progress. If not, at process block 116, a cold countdown period is loaded into a timer and the countdown is commenced. If the countdown is in progress, then from decision block 114, the routine branches to decision block 118 and the timer interrogated to see whether the cold period has elapsed. If it has, at process block 120, the flag is set indicating that the mill is cold and the cold set of parameters is used. In this case, the cold set of parameters will be a fraction of the initials feeder and steam valve settings and gain rates provided as 6, 7, 18 and 19 in Table. II as determined by the adjustment rate of parameter 5 of Table II.

Thus, if the pellet mill 10 is cold, the loading rate of the mill, is decreased. It has been determined that this "warm" or "cold" state of the pellet mill, whether it reflects die temperature or some other condition occurring after the mill has been in operation for a while, is a critical factor in determining the likelihood of the mill plugging. Thus, this routine 87 of FIG. 3, by tailoring the loading of the pellet mill 10 to this state of the pellet mill 10, can provide a conservative loading when the mill is cold but increase the loading when the mill is warm. Thus, the ultimate goal of more effectively utilizing the pellet mill is met.

3. Challenging the Pellet Mill

Once the initial operating parameters of the pellet mill 10 are determined, the pellet mill 10 starts operation. The dump chute 40 is closed and the die motor 52 and Centrifeeder auger 42 are started. Ingredients 14 are introduced to the feeder 16 and transmitted to the conditioner 24. Finally, die liquids are sprayed on the pellets exiting the die 48.

The feed rate of feeder 16 is initially set to the setpoint of parameter 6 of Table II but then is increased or decreased depending on the deviation of the horsepower of the die motor 52 with respect to its setpoint. The feed rate will be decreased if the horsepower climbs above the motor setpoint. Conversely, the feed rate will be increased if the horsepower drops below the motor setpoint. This feedback loop operates generally according to well understood control loop techniques and may be modified by adjustment of loop deadbands and gains as are entered by the operator on console 70.

when the ingredients 14 pass through the conditioner 24 they are heated by steam from steam inlet 30 controlled by valve 34 (shown in FIG. 1). A second control loop independently moderates the amount of steam passing through steam modulating valve 34 according to the temperature detected by temperature sensor 39. Generally, because the amount of steam required to produce a given temperature in the conditioner 24 will depend on the mass rate of ingredients flowing through the conditioner 24, the opening of valve 34 is adjusted constantly with the change in the feeder rate.

These analog control loop tasks of controlling feeder speed and steam input are generally accomplished by the analog I/O control task block 86 of the near real-time program 74.

Figure 4:
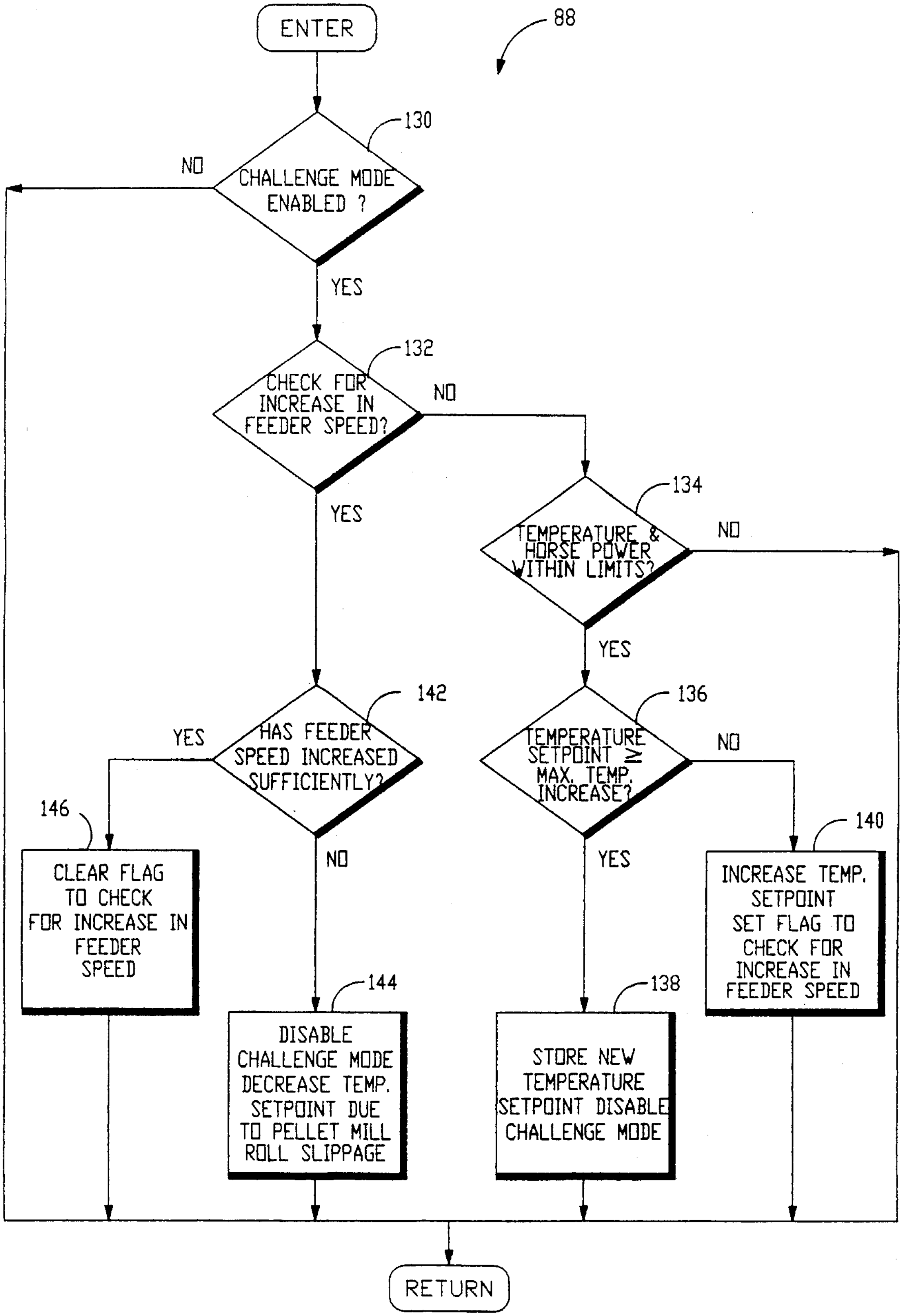
FIG. 4 is a flow chart of a portion of the program of FIG. 2 showing a procedure for optimizing the operation of the pellet mill without plugging.

Referring now to FIGS. 2 and 4, during steady state operation of the pellet mill 10, once the horsepower setpoint of local parameter 1 has been reached, the pellet mill 10 may be challenged to further optimize its efficiency. Challenging is an optional routine 88 performed during the analog I/O control tasks 88 and is invoked by local parameter 12 as tested at decision block 130. If the challenge mode is enabled, the routine 88 proceeds to decision block 132 and the speed of feeder 16 is examined to see if a flag has been set (to be described) indicating that any increase in the feeder speed should be checked.

The first time that the routine 88 arrives at decision block 132, the flag will be cleared and therefore the routine proceeds to decision block 134 to see if the temperature and horsepower of the conditioner 24 and the die motor 52 are within predetermined limits. If so, the conditioner temperature is checked, via temperature sensor 39, to see if it is less than or equal to a predetermined challenge maximum temperature increase (local parameter 16) at decision block 136. The challenge maximum temperature increase is a limit in how far the mill will be challenged even if the temperature during the challenge remains beneath its absolute limit.

If, at decision block 136, the temperature setpoint is greater than the challenge maximum temperature increase, then no further temperature increase is made and the routine proceeds to process block 138 and the current conditioner temperature is stored as the new initial temperature setpoint for that pellet type (local parameter 2). Alternatively, if the conditioner temperature is still below the challenge maximum temperature increase, the current conditioner temperature is increased by the temperature increment of local parameter 13, as indicated by process block 140, and the flag interrogated at decision block 132 is set. The routine then returns.

At the next return to decision block 132, the flag will have been set and the feeder speed is checked at decision block 142. If the increase in temperature of the ingredients 14 in the conditioner 24 has resulted in the extrusion into pellets being easier, then the horsepower required of the die motor 52 for the given feed rate will have dropped and the control loop linking the die motor 52 and the feeder 16 will cause an increase in feeder speed to bring the horsepower back to its setpoint.

Provided that the feeder speed has increased sufficiently (local parameter 14), the flag for checking the increase in feeder speed is cleared at process block 146 so that the temperature may again be increased at process block 140 as previously described. If the feeder speed has not increased sufficiently, then it is assumed that the maximum temperature of the conditioner 24 and the maximum practical throughput of the pellet mill 10 has been reached and the temperature setpoint is decreased slightly by a predetermined amount (local variable 13) at process block 144 and the routine exits.

Thus, the conditioner temperature is incrementally increased until no greater rate of material flow may be had at the desired horsepower. At the end of this process, the temperature ultimately obtained is used as the new temperature setpoint for that pellet type and is stored as local variable 2. The next time these pellets are made, the temperature may more quickly reach the optimum level or may be further adjusted. The limit on the temperature increase obtained in the challenge mode (local parameter 16) means that the temperature setpoint (local parameter 2) ultimately reflects the experience of a number of pellet runs.

4. Responding to a Potential Plug

Figure 5:
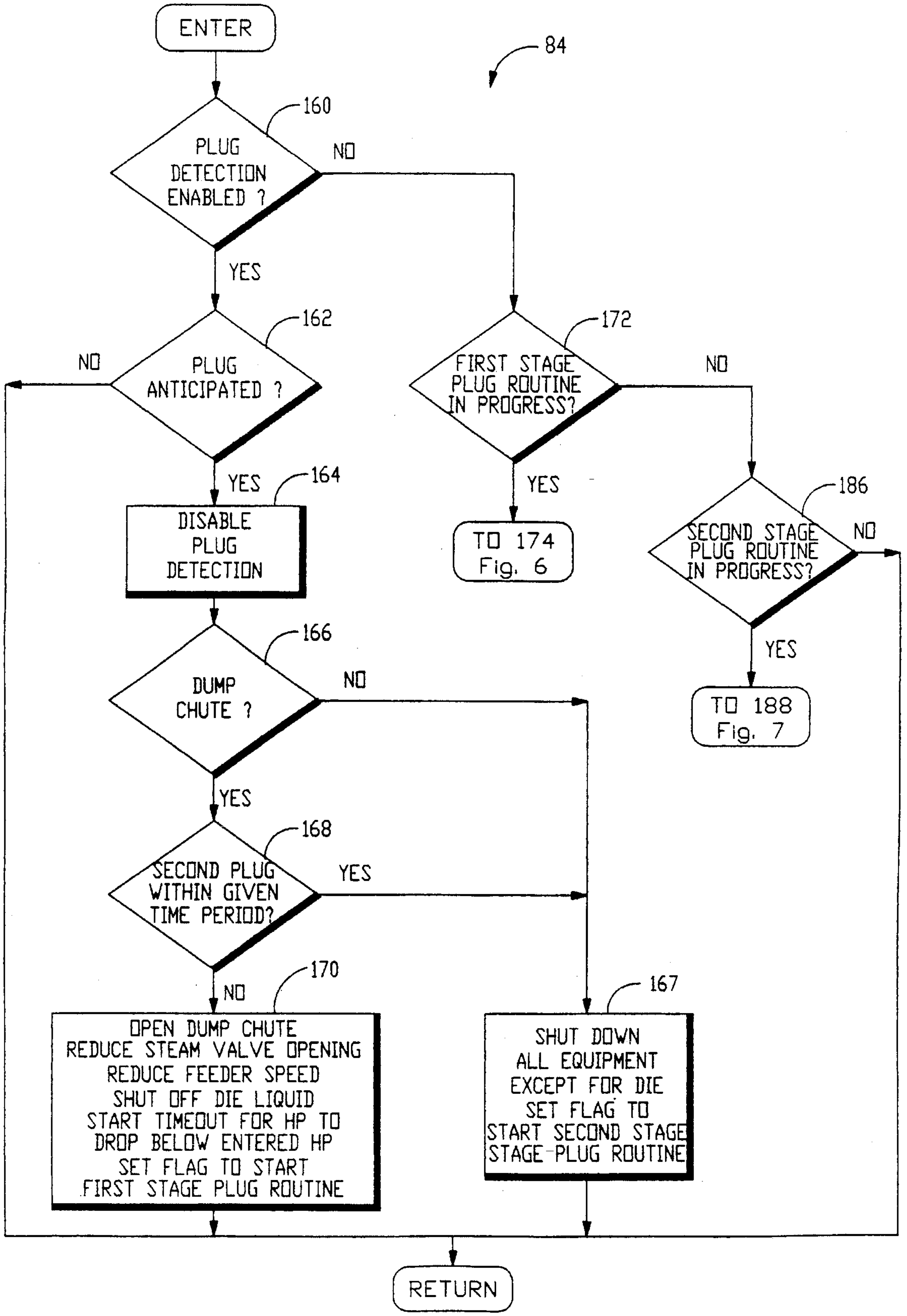
FIGS. 5, 6, and 7 are flow charts of portions of the program of FIG. 2 showing a graduated response to an anticipated plugging, FIGS. 6 and 7 showing the first and second stage of the response respectively.

Referring now to FIGS. 2 and 5, at regular intervals during the operation of the near real-time program 74, a plug detection routine 77 is executed via a hardware interrupt procedure known to those of ordinary skill in the art. A first portion of the plug detection routine 77 (not shown) determines the values of certain measures of the horsepower consumed by motor 52 corresponding to the limits of global parameters 6 through 9 as have been generally described. The second portion of the plug routine is performed if plug detection is enabled determined by an internal flag and as tested for in process block 160. Plug detection is initially enabled and only disabled, during limited intervals, by the detection routine itself.

Initially then, plug detection will be enabled and the routine 84 will proceed to decision block 162 which compares the limits of global parameters 6 through 9 to the trend of the horsepower consumed by motor 52 to determine whether a plug is anticipated. The first of these comparisons determines if the motor 52 is exceeding a maximum horsepower of global parameter 6. If the maximum horsepower exceeds the predetermined amount, the plug is anticipated and a plug flag is set. The second comparison checks the horsepower average deviation against global parameter 7. Again, if the limit of this parameter is exceeded, the system will anticipate a plug and set the plug flag. The third comparison checks the actual horsepower average against the limit of global parameter 8. If the actual horsepower average exceeds this limit, the plug flag is set. The fourth and final test reviews horsepower deviation and compares it to global parameter 9. Again, if the magnitude of the deviation is at or more than this limit, the plug flag is set.

If a plug is not anticipated, as indicated by the plug flag not being set at decision block 162, the plug detection routine is exited. However, if a plug is anticipated, the plug detection is disabled as indicated by process block 164 and the routine proceeds to decision block 166 where the routine checks to determine whether the particular pellet mill 10 has a dump chute 40. If not, the first stage of a graduated two-level approach to plug avoidance cannot be performed and a flag is set to start the second stage as will be described. However, if a dump chute 40 is available on the pellet mill 10, a two-level approach to plug avoidance may be adopted and the routine 84 proceeds to decision block 168 where it is determined whether the latest anticipated plug is the second to occur within a given time window provided by global parameter 15.

If the current potential plug is the second plugging to occur within the short time of the window, it is assumed that the first stage of the graduated two-stage response to plugging has been ineffective and the routine Jumps to process block 167 where the pellet mill process 10 is shut down except for the die motor 52 and a flag is set to begin the second stage of the plug response.

Alternatively, if the current plugging isn't the second plug within a given period of time, a two-stage response is employed. As indicated by process block 170, the dump chute 40 is opened diverting ingredients 14 to a standby area and not into the Centrifeeder auger 42 or the die and roller assembly 46. The steam modulating valve 34 and feeder speed are reduced by preset amounts as provided in global parameters 10 and 11. The die liquid is shut off by valve 57 and a timer is set to the time indicated by global parameter 14 for timing a drop in horsepower of motor 52 to below a predetermined level (global parameter 12). Finally a flag is set to complete the first stage of the plug avoidance routine that follows the opening of the dump chute 40.

This first stage of the plug avoidance routine, which simply opens the dump chute 40, avoids the shutting down of the entire pellet mill 10, and in particular, avoids the shutting down of the conditioner 24, thereby providing a plug avoidance approach that is much less time consuming than the second stage, which as will be explained, shuts down all the equipment except for the motor 52.

Figure 6:
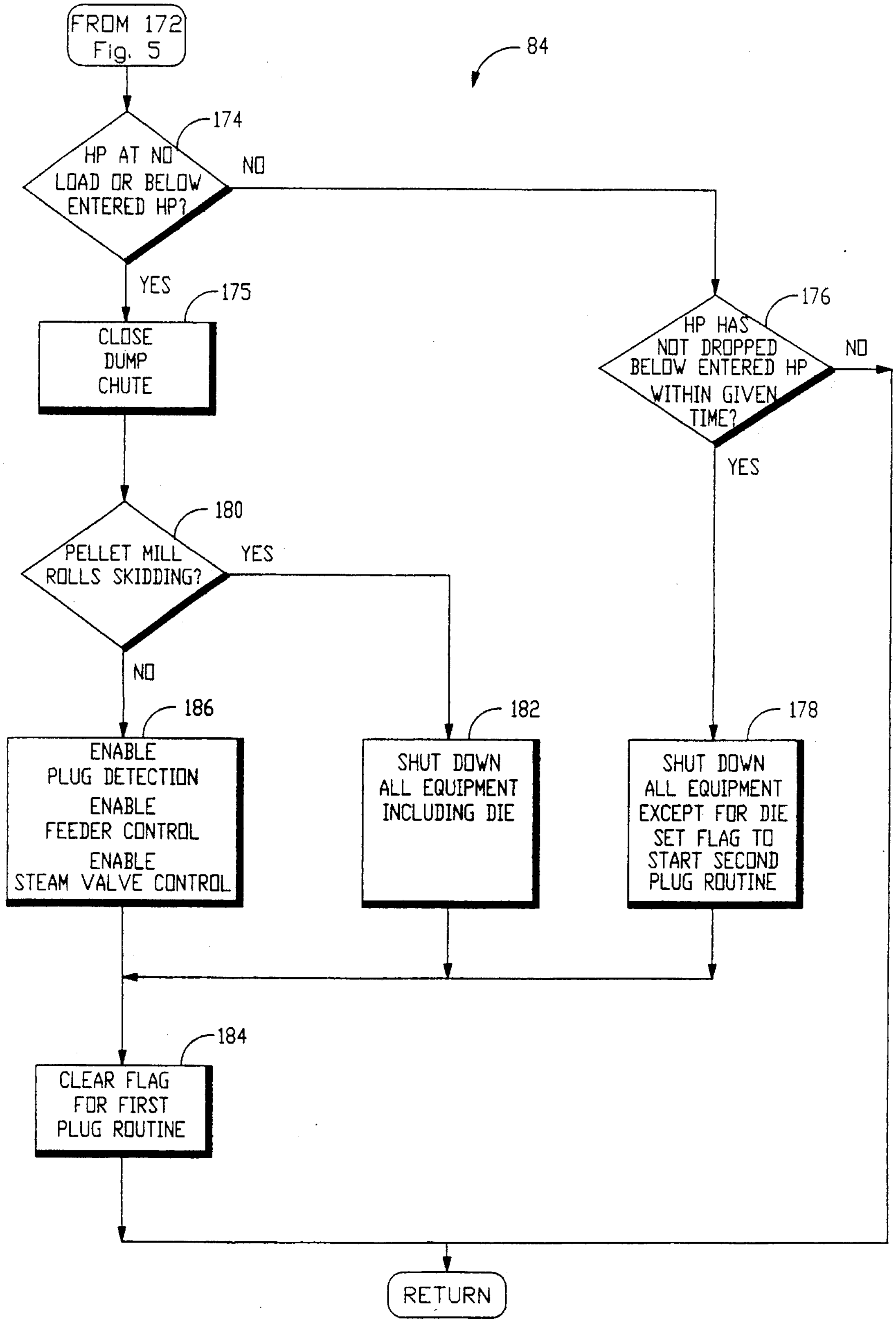

As described above, at process block 164 the plug detection was disabled. Accordingly, at the next entry of the routine 84 at decision block 160, in the next interrupt interval, the routine will proceed to decision block 172. If at decision block 172, the first stage plug routine flag has been set then it is assumed that the first stage plug routine is in progress or is to be initiated, and the routine proceeds to decision block 174 of FIG. 6.

At decision block 174, the horsepower to the motor 52 is examined to be if it is below the horsepower of global parameter 12. If not, at decision block 176, the timer set in process block 170 is examined to determine if insufficient time has been allowed for the horsepower to drop to the predetermined level. If the time period of global parameter 14 has not expired, the routine 84 returns and waits until the next interrupt interval. If the time has elapsed, however, the routine 84 proceeds to process block 178 which is essentially identical to process block 167 and which shuts down all equipment except for the pellet mill die and which sets the flag to start the second stage of the response routine 84 at the next interrupt interval.

Referring again to decision block 174, if the horsepower of motor 52 is at or below the predetermined horsepower, the dump chute 40 is closed at process block 175. At decision block 180, the horsepower is again examined and compared to the value of global parameter 12 to determine whether the pellet mill rolls are skidding. This determination is made by examining whether the horsepower of the motor 52 increases sufficiently within a predetermined time of resuming the flow of ingredients. If not, skidding of the rollers is occurring. If such skidding occurs, the plug avoidance was unsuccessful and the routine 84 proceeds to process block 182 where all of the pellet mill equipment 10 including the motor 52 is shut down. Then the routine proceeds to process block 184 and clears the flag for the first stage of the plug routine.

Assuming, instead, that at decision block 180 the plug avoidance was successful, there will be no roll skidding and the routine will proceed to process block 186 where plug detection will be re-enabled and the feeder and steam modulating valve will be reactivated to initial setpoints for normal operation. Again, the flag for the first stage of the plug routine is reset.

Figure 7:
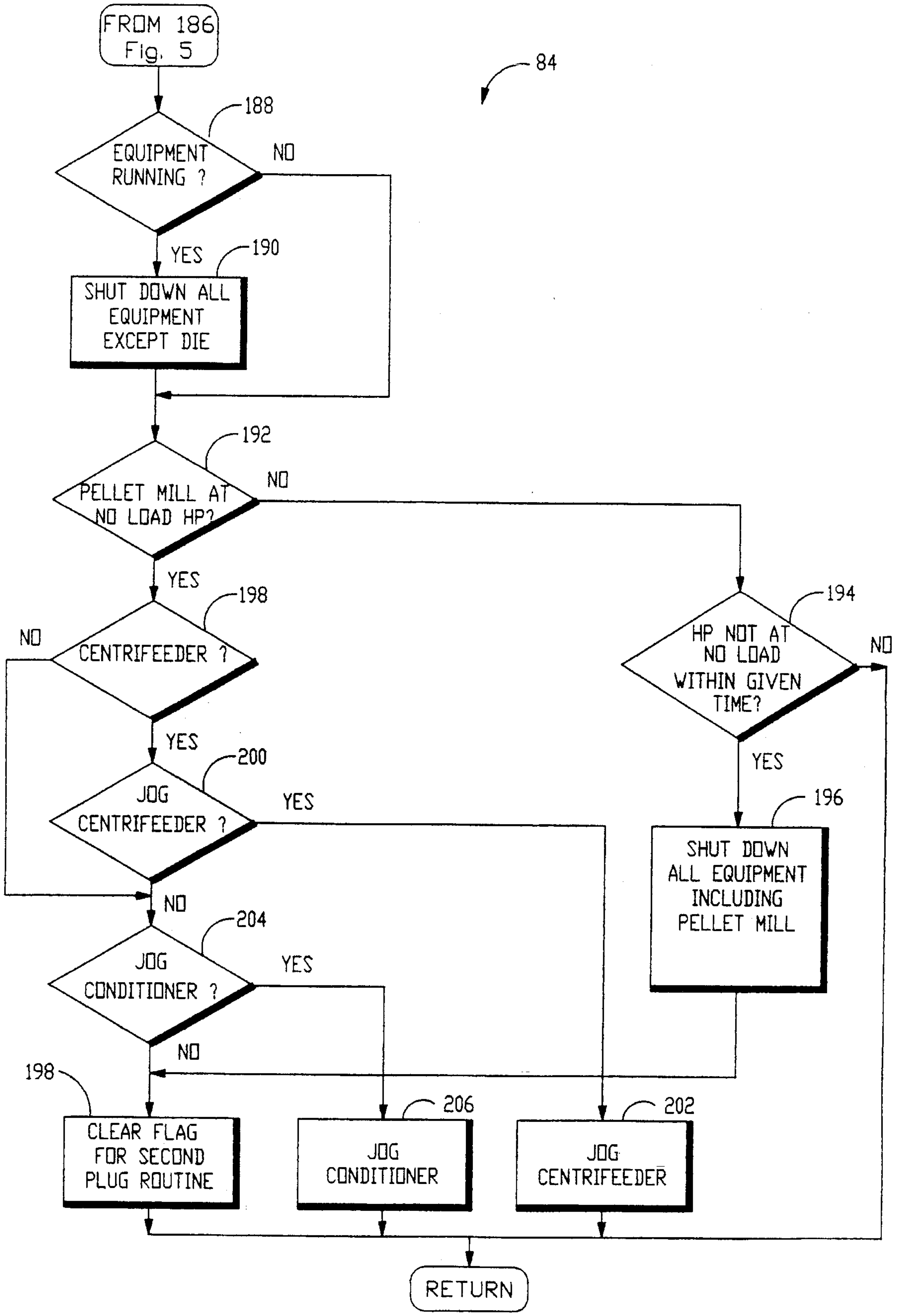

Referring again to FIG. 5, in certain cases the first stage of the plug routine will not be selected, either because there have been multiple pluggings detected within the given time period, as indicated by decision block 168, or because the opening of the dump chute 40 did not suitably lower the horsepower on the motor 52. In this case, referring to FIGS. 5 and 7 at decision block 172 of FIG. 5, the first stage plug routine will neither be in progress or ready to be initiated. In this case, the routine 84 will proceed to decision block 186 where, if the second stage plug routine is in progress or to be initiated, as indicated by a second stage plug routine flag, the routine 84 will proceed to decision block 188 as shown in FIG. 7.

Typically, when the routine reaches process block 188 the pellet mill will have been shut down except for the motor 52. This will have been done by process block 167 or process block 178. Nevertheless, decision block 188 checks to see if the pellet mill 10 is running and if so shuts down all of the equipment, except for the motor 52, at process block 190.

The routine then proceeds to process block 192 and the horsepower consumed by motor 52 is checked if the pellet mill is at a no-load horsepower. If not, the routine proceeds to decision block 194 to see if the failure to reach no-load horsepower could be because sufficient time has not elapsed. These steps are analogous to decision blocks 174 and 176 as described above. If a sufficient time has not elapsed, the routine returns and the elapsed time is checked continually at repeated interrupt cycles. If, when sufficient time has elapsed, the horsepower has not dropped below a no-load condition as checked by decision block 194, the routine proceeds to process block 196 and the entire pellet mill including the motor 52 is shut down. After this the flag for the second plug routine is cleared at process block 198 and the routine returns. The state indicated by process block 196 reflects a failure to resolve the plugging problem even with the complete shut down of the feeder and an extended running of the motor 52 without introducing new ingredients 14.

If the running of the motor 52 for the longer period of time that may be sustained when the feeder is turned off ultimately does produce a no-load horsepower as checked at decision block 192, the routine proceeds to decision block 198 to check if the pellet mill includes a Centrifeeder auger 42. If so, the Centrifeeder auger 42 is jogged (briefly turned on) as determined at decision block 200 and performed at process block 202.

If there is no Centrifeeder auger 42 or if the operator chooses not to jog the Centrifeeder auger 42 as determined by an entered parameter (not shown) then the routine proceeds to decision block 204. Instead of or in addition to the jogging of the Centrifeeder auger 42, the conditioner 24 may be jogged as checked for by decision block 204 and performed at process block 206. In all cases, the routine then proceeds to process block 198 and the second plug routine flag is cleared.

The ability to address a potential plugging of the die 48 with a graduated response, one of which simply opens the dump chute and keeps the flow of material continuing at an abated pace for a short period of time, increases the ability to rapidly restart the pellet mill 10 when the risk of plugging has ended and thus improves the efficiency of the pellet mill 10 over the long run. Nevertheless, more severe measures may be adopted (stopping the feeder and running the die for a longer time) if the risk of plugging is not abated. The net effect of this two-stage response is to allow the pellet mill 10 to operate closer to its limits while providing adequate response to the risk of plugging.

5. Recycling Fines

Figure 8:
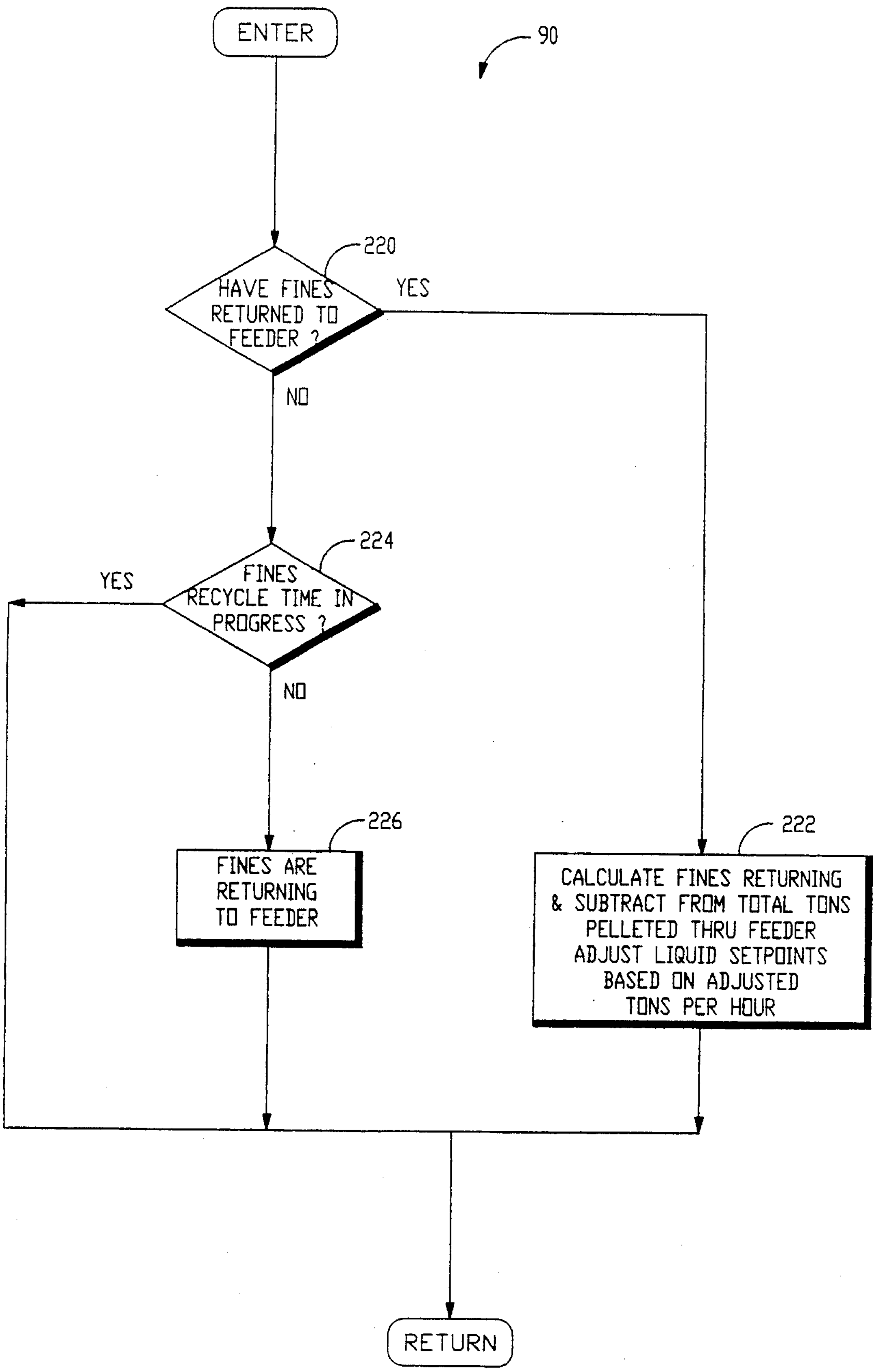
FIG. 8 a flow chart of a portion of the program of FIG. 2 showing control of the pellet fine return as permits recycling of pellet fines.

Referring now to FIG. 8, after an initial time has expired, indicated by global parameter 3, it is assumed that some of the materials entering the feeder 16 are not dry ingredients 14 but are the returned fragments of ingredients 14 previously processed into pellets 62 in the form of fines collected after the pellets 62 exit the die 48. The conclusion of this recycling time is detected at process block 220 which tests for a flag set by decision block 224 and process block 226 which performs the timing operation.

If the recycling time has expired, it is assumed that fines are returning to the feeder 16 and the PDI factor is used to calculate the total mass of fines returning to the feeder 16 based on the mass of ingredients 14 being moved by the feeder 16. This latter value is determined by the feed rate of the feeder 16, communicated via a tachometer signal from the feeder motor 26 and a known density of the ingredients as indicated by local parameter 3. Generally, the PDI factor is determined empirically and depends on the particular constituents of the pellet and on the die size. Alternatively, and as shown in FIG. 1, an impact scale 71 may be used to estimate the mass rate of the fines directly from the chute 66 avoiding the need for a PDI factor associated with the particular type of ingredients used and pellets made.

At process block 222, the calculated mass rate of returning fines is subtracted from an ongoing total of the tonnage of pellets produced, and this adjusted value is reported to the user via console 70. As mentioned above, an accurate reporting of pellet throughput is critical in the improvement of the operating efficiency of the pellet mill 10.

The mass rate of the returning fines is also used to adjust the ratio of the amount of liquid provided to the conditioner 24 as controlled by valve 36 (shown in FIG. 1). As mentioned above, one or more conditioner liquids are metered to the conditioner 24 in proportion to the feed rate of ingredients as controlled by local parameter 4. The mass rate of the fines is thus used to reduce this local parameter 4 to account for the fact that the fines have previously been mixed with liquid. This adjustment is a simple multiplication of local parameter 4 by the ratio of the mass rate of fines to the mass rate of ingredients without the fines (as determined from the feeder rate and the mass rate of fines).

5. Automatic Fine Clean-out

Figure 9:
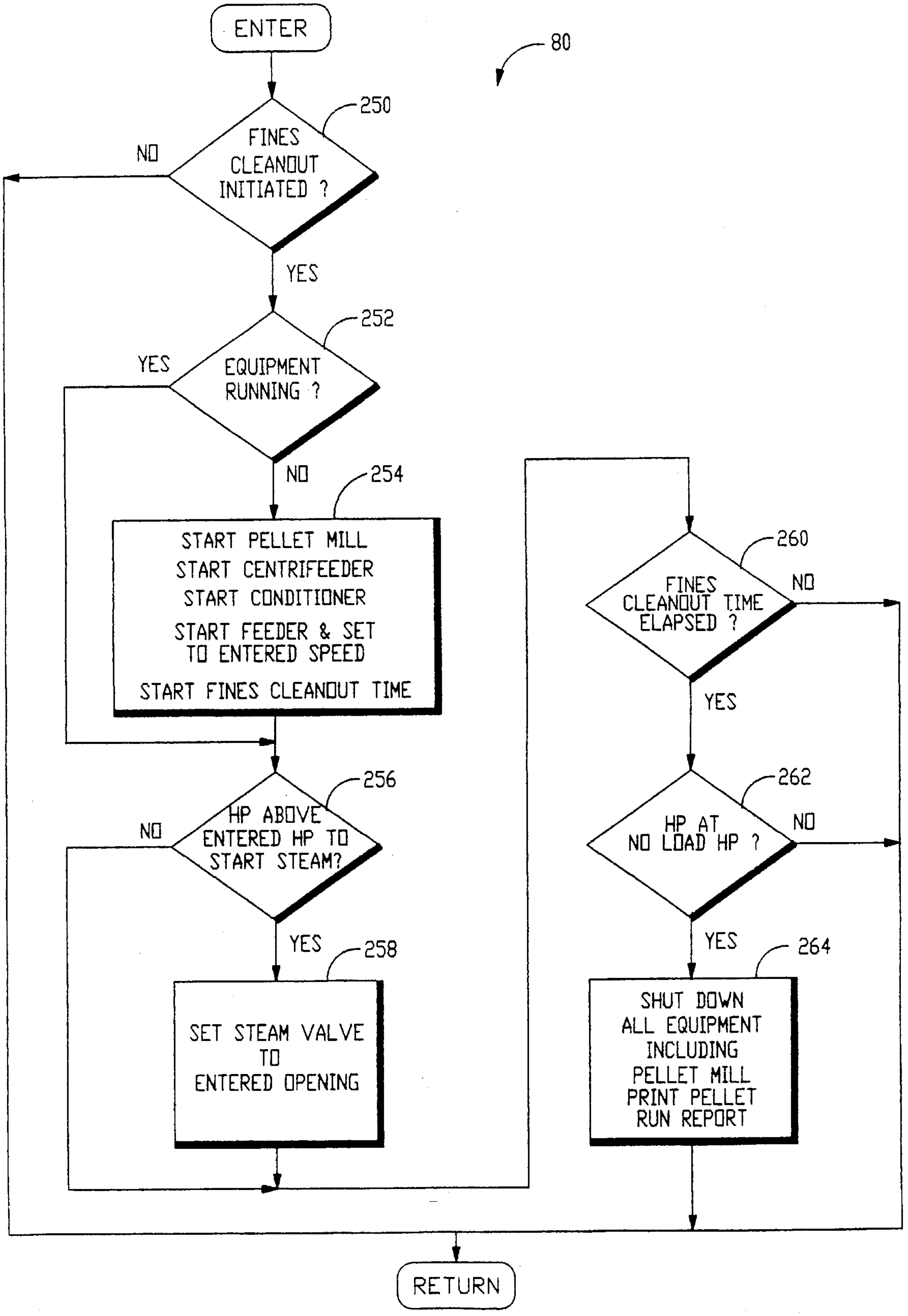
FIG. 9 is a flow chart of a portion of the program of FIG. 2 showing of an automatic fines clean-out cycle.

Referring now to FIGS. 2 and 9, at the conclusion of the pelleting run, which may be determined by reference to the total tons collected during the calculation of process block 222 of FIG. 8, the operator may initiate an automatic fines clean-out 80.

At the conclusion of a pellet run, dry feed 14 is no longer introduced into the hopper 12 and at the end of a clean-out delay (global parameter 4) the feeder 16 is stopped. A flag set by the operator through console 70 (similar to that of local parameter 12) is tested at decision block 250 and if a fines clean-out is desired, the routine proceeds to decision block 252 to determine if the equipment is running. If not, at process block 254, the pellet mill is restarted to the conditions provided by local parameter 8 which sets the feeder speed, and a clean-out time countdown is begun, the clean-out time being global parameter 5.

The routine next proceeds to decision block 256 to check the horsepower of the motor 52 and to turn on the steam at process block 258 if that horsepower at decision block 256 is above local parameter 17 which is used to reduce the horsepower on the motor 52 when such a rise is detected. The steam modulating valve, for clean-out, is opened to the value of local parameter 9.

The routine then proceeds to decision block 260 which checks whether the minimum fines clean-out time has elapsed. If so, at decision block 262, the horsepower is checked again to see if it is dropped to the no-load value (local parameter 15). Only after that drop has occurred does the routine proceed to process block 264 and the pellet run is completed with the fines completely cleaned out. At this time a report summarizing the statistics of the pellet run may be prepared.

Many other modifications and variations of the preferred embodiment which will still be within the spirit and scope of the invention will be apparent to those with ordinary skill in the art. In order to apprise the public of the various embodiments that may fall within the scope of the invention, the following claims are made:

We claim:

1. A controller for a pellet mill, the pellet mill, when operating, receiving ingredients into a conditioner and heating the same to a temperature and receiving the heated ingredients from the conditioner into a die and roller assembly, at a feed rate, for extruding the same through the die under the action of the roller while consuming a power, the controller comprising:

a state indicator providing a state signal indicating whether the pellet mill is in a first state or a second state;

a memory means receiving the state signal for providing a warm parameter for the control of the pellet mill when the state signal indicates that the pellet mill is in the first state and a cold parameter for the control of the pellet mill when the state signal indicates that the pellet mill is in the second state; and a timer responsive to the operation of the pellet mill for changing the state of the state indicator from the first state to the second state when the pellet mill has not operated for a first predetermined period of time and for changing the state of the state indicator from the second state to the first state when the pellet mill has operated for a second predetermined period of time.

2. The controller of claim 1 wherein the parameter is an initial feed rate.

3. The controller of claim 1 wherein the parameter is an initial temperature.

4. The controller of claim 1 wherein the first and second predetermined periods are the same.

5. The controller of claim 1 wherein the timer is reset only upon a change of state of the state indicator.

6. The controller of claim 1 wherein the memory means generates the cold parameter by multiplying the warm parameter by an adjustment percentage.

* * * * *

UNITED STATES PATENT AND TRADEMARK OFFICE
CERTIFICATE OF CORRECTION

PATENT NO. : 5,582,847

DATED : December 10, 1996

INVENTOR(S) : Norman R. Peterson et al.

It is certified that error appears in the above-identified patent and that said Letters Patent is hereby corrected as shown below:

Col. 5, line 21 "crumbier" should be --crumbler--

Col. 10, line 36 "when" should be --When--.

Col. 12, line 32 "Jumps" should be --jumps--.

Signed and Sealed this

Thirteenth Day of May, 1997

Attest:

BRUCE LEHMAN

*Attesting Officer*

*Commissioner of Patents and Trademarks*